Oct. 2, 1923.
F. B. HEWEL
TRUCK HOIST
Original Filed March 5, 1921
1,469,642
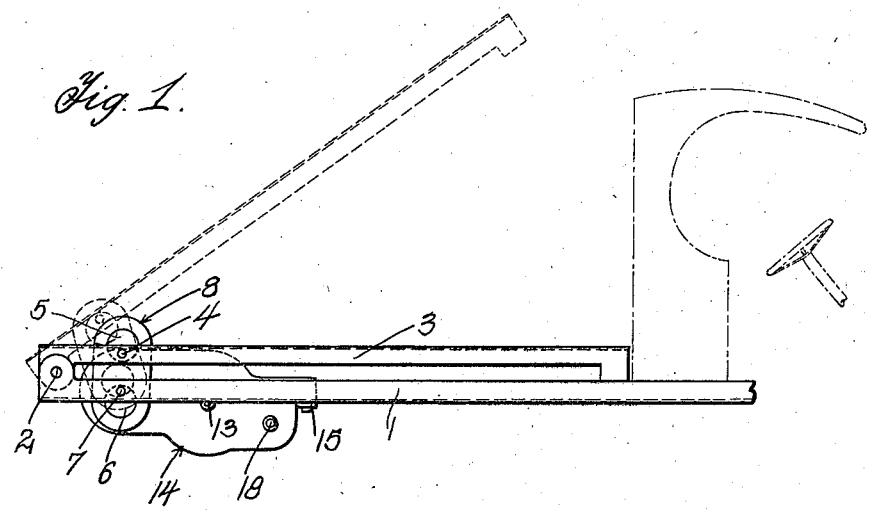
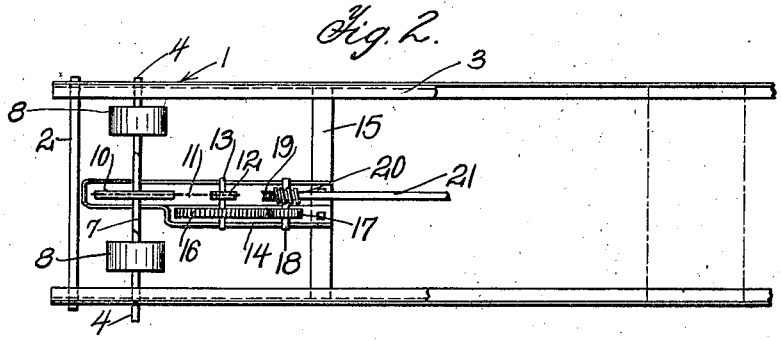
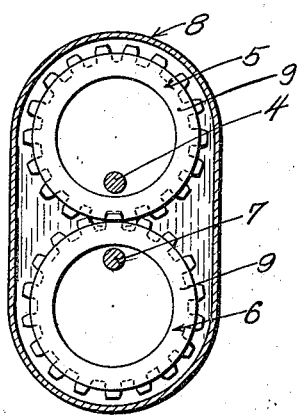
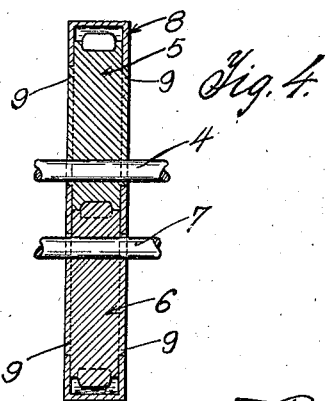
F. B. Hewel
INVENTOR
BY Victor J. Evans
ATTORNEY Patented Oct. 2, 1923.

1,469,642

UNITED STATES PATENT OFFICE.

FRANK B. HEWEL, OF AKRON, OHIO.

TRUCK HOIST.

Application filed March 5, 1921, Serial No. 449,918. Renewed July 17, 1923.

*To all whom it may concern:*

Be it known that I, FRANK B. HEWEL, a citizen of the United States, residing at Akron, in the county of Summit and State of Ohio, have invented new and useful Improvements in Truck Hoists, of which the following is a specification.

This invention relates to truck hoists, and more particularly to means for elevating the body of a truck for dumping purposes.

One of the main objects of the invention is to provide simple and efficient means whereby the truck body may be elevated or tilted for dumping purposes. A further object is to provide means of the character stated by which great power may be exerted for lifting the truck body, this means also serving to lower the body easily into normal position upon continued operation. Further objects will appear from the detailed description.

In the drawings:

Figure 1 is a fragmentary side view of a truck frame showing the invention applied.

Figure 2 is a top plan view partly broken away.

Figure 3 is a detail of the lifting and lowering gears and the casing thereof, the casing being shown in section.

Figure 4 is a central vertical section through the lifting and lowering gears and the gear casing.

The truck frame or chassis 1 may be of any suitable or preferred construction and is hingedly connected by a rod 2 at its rearward end to the rearward end of a subframe 3 upon which the truck body may be secured in the known manner by means of an upper sub-frame secured to sub-frame 3. A shaft 4 is rotatably mounted in frame 3 and is provided with a gear 5 which is eccentrically secured upon the shaft and meshes with a similar gear 6 secured on a shaft 7 rotatably mounted transversely of frame 1. In practice each shaft is provided with two gears and gears 5 and 6 are enclosed by a casing 8 provided in each lateral wall with two openings which snugly receive disc elements 9 integral with and projecting from the faces of the gears. This casing serves to maintain the gears in proper mesh and elements 9 act to support the load of sub-frame 3 and the body carried thereby, as will be clear by referring to Figures 3 and 4 so as to prevent mutilating of the gear teeth.

A sprocket wheel 10 is secured on shaft 7 centrally thereof and is connected by a chain 11 to a sprocket pinion 12 secured on a stub shaft 13 rotatably mounted in a casing 14 supported by shaft 7 and a cross bar 15 secured to frame 1. A sprocket gear 16 is secured on shaft 13 and meshes with a spur pinion 17 secured on a counter shaft 18 rotatably mounted at the forward portion of casing 14. A worm wheel 19 is secured on counter shaft 18 and meshes with a worm 20 of a drive shaft 21 which extends forwardly of frame 1 and may be connected to the transmission of the engine on the truck in any suitable or preferred manner.

The gears 5 and 6 are illustrated in Figure 3 as in their normal position. Upon rotation of shaft 21 shaft 7 is rotated thus turning the gears so as to position shafts 4 and 7 adjacent to the opposite ends of casing 8. This results in raising the sub-frame into substantially the position indicated in Figure 1 and continued rotation of shaft 7 brings the gears into the positions illustrated in Figure 3 thus lowering the sub-frame and locking it in lowered position.

As will be understood, it may be found desirable in practice to resort to changes in details of construction and arrangement of parts of the invention without departing from the field and scope of the same, and I intend to include all such variations, as fall within the scope of the appended claims, in this application in which a preferred form only of my invention is disclosed.

What I claim is:—

1. In truck hoist means, a main frame, a sub-frame hinged to said main frame, a shaft rotatably mounted in the sub-frame in advance of the hinge axis thereof, a shaft rotatably mounted in the main frame, a gear eccentrically secured upon the shaft of the sub-frame, a gear eccentrically secured upon the shaft of the main frame and in mesh with the gear on the sub-frame, and means for rotating the shaft carried by said main frame.

2. In truck hoist means, a main frame, a sub-frame hinged at its rearward end to the main frame, a shaft rotatably mounted in the sub-frame, a shaft rotatably mounted in the main frame, intermeshing gears eccentrically secured upon said shafts in similar relation thereto, and means for rotating the shaft carried by said main frame.

3. In truck hoists means, a main frame, a sub-frame hingedly secured at its rearward end to the main frame, a shaft rotatably mounted in the sub-frame, a shaft rotatably mounted in the main frame, intermeshing gears eccentrically secured upon the respective shafts, and means for supporting the load when the sub-frame is raised.

4. In truck hoist means, a main frame, a sub-frame hingedly secured at its rearward end to the main frame, a shaft rotatably mounted in the sub-frame, a shaft rotatably mounted in the main frame, intermeshing gears eccentrically secured upon the respective shafts, and means for holding the gears in mesh.

5. In truck hoist means, a main frame, a sub-frame hingedly secured at its rearward end to the main frame, a shaft rotatably mounted in the sub-frame, a shaft rotatably mounted in the main frame, intermeshing gears eccentrically secured on the respective shafts, means for rotating the shaft mounted in the main frame, and a casing enclosing said gears and provided in its side walls with circular openings, the gears being provided with elements fitting into said openings so as to be held in mesh by the casing, said elements serving to support the load during raising and lowering of the sub-frame.

In testimony whereof I affix my signature.

FRANK B. HEWEL.